United States Patent [19]

Udvardi-Lakos

[11] 4,151,586
[45] Apr. 24, 1979

[54] METHOD AND APPARATUS FOR SHUTTING DOWN AN INVERTER

[75] Inventor: Janos Udvardi-Lakos, Erlangen, Fed. Rep. of Germany

[73] Assignee: Siemens Aktiengesellschaft, Munich, Fed. Rep. of Germany

[21] Appl. No.: 832,920

[22] Filed: Sep. 13, 1977

[30] Foreign Application Priority Data

Sep. 20, 1976 [DE] Fed. Rep. of Germany ....... 2642240

[51] Int. Cl.² .............................................. H02M 1/18
[52] U.S. Cl. .......................................... 363/57; 363/96
[58] Field of Search ............... 307/64, 66; 363/56–58, 363/96, 135, 136

[56] References Cited

U.S. PATENT DOCUMENTS

| | | |
|---|---|---|
| 3,315,144 | 4/1967 | Poss ........................................ 363/96 |
| 3,378,751 | 4/1968 | Walker ..................................... 363/56 |
| 3,715,649 | 2/1973 | Ravas ...................................... 363/42 |
| 3,760,258 | 9/1973 | Percorini et al. ........................ 363/56 |
| 3,986,098 | 10/1976 | Tamii et al. ........................... 307/64 X |

*Primary Examiner*—William M. Shoop
*Attorney, Agent, or Firm*—Kenyon & Kenyon, Reilly, Carr & Chapin

[57] ABSTRACT

Upon a stop command, the current conducting state of the main valves and the recovery valves of an inverter with bridged valves is monitored. A change of the firing pulses for the main valves is blocked if the valves connected to one d-c bus of the inverter conduct current simultaneously. After a predetermined time has passed or upon the arrival of a monitoring signal that the current in the inverter is extinguished, the transmission of the firing pulses to the controlled main valves of the inverter is then blocked.

4 Claims, 6 Drawing Figures

METHOD AND APPARATUS FOR SHUTTING DOWN AN INVERTER

BACKGROUND OF THE INVENTION

The invention relates to inverters in general and more particularly to a method for shutting down an inverter with bridge arms with controlled main valves, and further bridge arms with recovery valves, the control terminals of which are connected via an enabling unit to a control set, to which a control voltage determining the firing angle of the firing pulses is fed. The invention further relates to a circuit for implementing the method according to the invention.

Inverters of the aforementioned type are described in U.S. Pat. Nos. 3,999,078 and 4,020,360 and in U.S. Applications Ser. No. 617,157. In these known inverters, the control device, which contains a controller and a control set, is connected to the control terminals of the controlled valves of the inverter via an enabling unit. Measures are taken so that a control voltage which corresponds to the desired output voltage of the inverter at any starting instant is already fed to the control set in a standby position. In the standby position, the control set already generates firing pulses for the inverter which, however, are blocked by the enabling unit. Upon a start command, the enabling unit is switched to pass the firing pulses. This makes it possible for the inverter to deliver the desired output load power particularly fast.

In many applications of inverters, the problem of shutting down the output stage of an inverter as fast as possible also arises. This is the case, for instance, in so-called converter drives, where a rotating field machine is fed via a frequency changer which consists of a rectifier, an intermediate link and an inverter. In the event of a failure of the rectifier supply, a defect in the rectifier or the blowing of a fuse in the d-c inputs to the inverter, a rapid shutdown of the inverter may become necessary. In interruption free power supplies with inverters of the type mentioned at the outset, it is also desireable to shut down the output stage of the inverter as quickly as possible upon the return of the line voltage, in order to prepare the inverter and the switching means for a new fast start.

Shutting down inverters is customarily accomplished by switching off the d-c supply and discharging the smoothing means and filter circuits following the inverter. During this process, the controlled valves of the inverter continue to receive timing pulses. The d-c supply is switched off and the smoothing means and filter circuits are discharged by means of mechanical switching means. With this procedure, it takes a relatively long time before the firing pulses for the controlled valves of the inverter can be switched off.

SUMMARY OF THE INVENTION

It is an object of the present invention to describe a method for shutting down inverters which can be used for all inverters with bridged main valves and bridged reverse biased valves regardless of the kind of commutation (individual quenching, sum quenching, sequential quenching) and which permits shutting down an inverter very fast. A circuit for implementing this method should be of simple design and, in particular, require no changes in the pulse program of the control unit.

According to the present invention, this problem is solved by monitoring the current conducting state of the valves upon a stop command; by blocking a change of the firing pulses for the main valves if the valves connected to one d-c bus of the inverter carry current simultaneously; and, after a predetermined time has passed or upon arrival of a monitoring signal that the current in the inverter is extinguished, by blocking the transmission of the firing pulses to the controlled main valves.

The method according to the present invention starts out with the premise that a fast shutdown of an inverter is possible without danger if a zero output voltage is impressed by the state of conduction of the valves of the output stage of the inverter. Therefore, the state of conduction of the main valves and the recovery diodes is monitored. If all valves connected to one d-c bus carry current, it is assumed that the output voltage of the inverter is zero. A further change of the firing pulses for the main valves is now blocked. The valves which are connected to a d-c bus and already carry current thereby remain in the current carrying state for the time being. The current is extinguished by itself due to the ohmic losses, if the load is passive. If the load is active, by blocking the firing pulses after a predetermined time has passed or after the arrival of a monitoring signal, the main valves are prevented from firing again. In addition, interrupting the connection to the load may be advantageous.

In inverters with controlled main valves and controlled quenching valves, intervention in the control of the quenching valves is not necessary at all. In such inverters, the current in the inverter is quenched by blocking the firing pulses for the main valves by the described method, the quenching valves continuing to receive firing pulses for at least another period.

In all inverter types with bridged valves, however, the firing pulses for all controlled valves of the inverter can be blocked if the current through valve combinations which furnish an output voltage different from zero is extinguished. This can be accomplished either by monitoring the current conducting state of the valves and observing timing conditions, or by means of a monitoring device which indicates by a signal that the current in the inverter is extinguished.

It is a particular advantage of the method according to the present invention for shutting down an inverter that it is not necessary to switch off the d-c supply.

The periods of time, during which the output voltage of the inverter is zero, depend on the instantaneous output voltage of the inverter. One further embodiment of the method according to the present invention therefore provides that, upon a shutdown command, the control voltage for the control unit is changed in a direction toward the smallest possible output voltage of the inverter. It is thereby achieved that the next instant during which the valves of the inverter which are connected to a d-c bus carry current simultaneously is reached already after a shorter time.

In principle, current measuring transformers in the load leads of the controlled main valves and the recovery valves which are followed by limit indicators can be used for monitoring that state of the valves. The output signals of the limit indicators indicate whether the valve in question is in the current conducting or cut-off state. The output signals of the limit indicators can be linked to form a signal which indicates whether or not all valves connected to a d-c bus are in the current conducting state.

However, it is also possible to draw conclusions from the firing pulses for the main valves as to the state of the latter and the recovery valves. It is assumed here that a main valve is actually fired if a firing pulse is present at its control terminal.

An advantageous circuit for implementing the method according to the present invention, which operates in accordance with this principle is characterized by the following features:

(a) the enabling unit contains inhibit gates at its input, the inputs of which gates are addresses by the firing signals for the main valves and by a change blocking signal and the outputs of which are connected to the inputs of bistable multivibrators, the outputs of which are connected to the inputs of inhibit gates at the output, the further inputs of which are acted upon by a blocking command;

(b) a monitoring device with logic means monitors the output signals of the bistable multivibrators indicating the valve state of the main valves and generates a zero voltage signal if the firing signals for the main valves connected to one d-c bus of the inverter are present simultaneously;

(c) an AND gate links the stop command with the zero voltage signal to form the change blocking signal for the inhibit gates at the input of the enabling unit;

(d) delay means addressed by the change blocking signal form a blocking command for the inhibit gate at the output of the enabling unit.

The delay time of the delay means is designed in view of the signal propagation times of the firing pulses and the firing delay time of the controlled main valves of the inverter. It is ensured thereby that the main valves of the inverters are actually already in the current carrying state when the blocking command for the inhibit gates at the output of the enabling unit is generated.

The particular advantage of the circuit according to the present invention is seen in the fact that no intervention of any kind into the control set is necessary. The control set can continue to run or be switched off completely uninfluenced by the shutdown command.

DETAILED DESCRIPTION OF THE INVENTION

Figure 1:
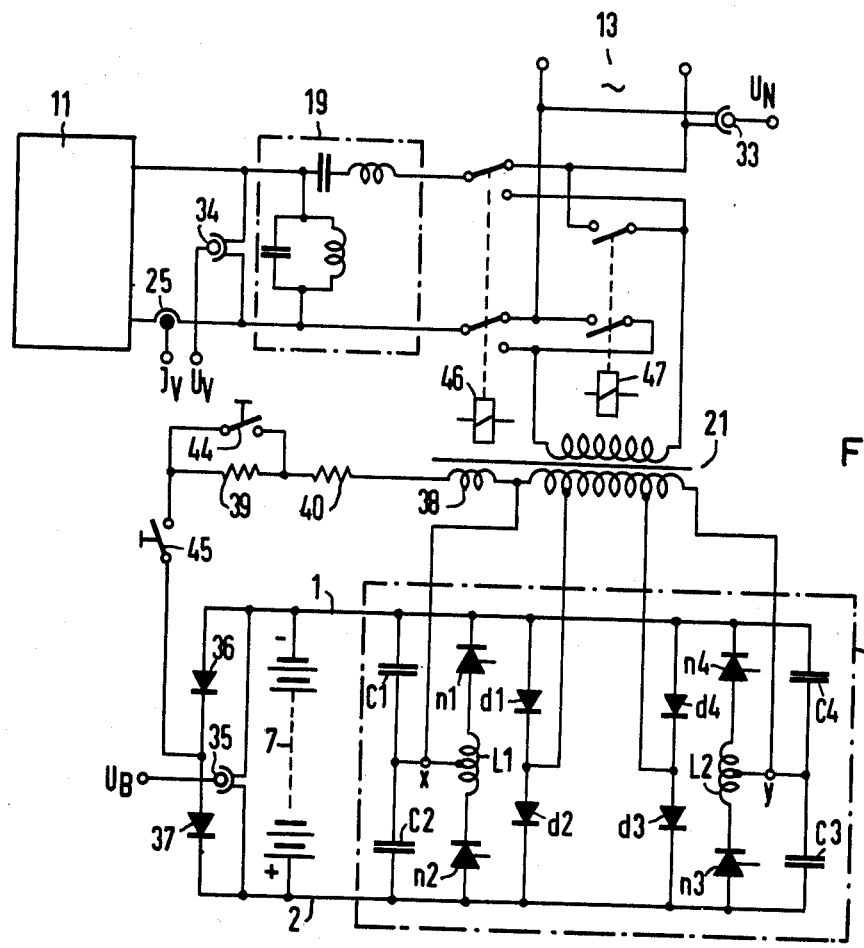
FIG. 1 is a block diagram of an interruption free power supply with an inverter according to the present invention.

FIG. 1 shows an interruption free power supply for a consumer or load 11. In normal operation, the consumer 11 is fed from an a-c supply network 13 and in emergency operation, via an inverter 15 from a battery 17. A filter 19 is connected in series with the consumer 11. The filter input is connected via switching means 46 and 47 either to the a-c network 13 or to the transformer 21 of the inverter 15. In normal operation, the switch contacts of the switching device 46 are in the position shown. When switched to emergency operation, the contacts of the switching device 46 are reversed and connect the filter input and, therefore, the consumer, directly to the transformer 21 of the inverter 15. The filter 19 is therefore always connected in series ahead of the consumer 11. In normal operation, it attenuates low and high frequency distortion of the line voltage. In switching from normal operation to operation from the substitute power source (battery 17) and during the switching back to normal operation, the filter acts as a short term energy storage device for bridging the switching times. During emergency operation via the inverter, the filter filters the output voltage of the inverter. Since there requirements are not contradictory, it is possible to design the elements of the filter appropriately. Instead of the filter 19 shown as an example in the drawing, other filter arrangements can also be used, such as are described, for instance, in the German Offenlegungsschrift 24 48 427.

The load voltage $U_V$ is measured by a voltage measuring transformer 34, which is arranged between the filter 19 and the load 11. The load current $I_V$ is measured by a current measuring transformer 25. The line voltage $U_N$ is measured by a voltage measuring transformer 33.

An inverter 15 with sequential commutation is shown. In inverters with sequential commutation, rapid shutdown is particularly difficult, since no separate commutation circuits are associated with the controlled main valves. However, the present invention is not limited to inverters with sequential commutation but is suited for any type of inverter with bridged valves.

The inverter 15 shown comprises two bridge arms with controlled main valves n1, n2 and n3, n4 (silicon controlled rectifiers) as well as two parallel connected further bridge arms with recovery valves d1, d2, d3 and d4 (diodes). Commutating capacitors C1 to C4 are associated with the controlled main valves. The controlled main valves n1 and n2 are connected to each other by a choke L1, the center x of which is connected to the center of the bridge arm with the capacitors C1 and C2. In the same manner, the controlled main valves n3 and n4 are connected to each other via a choke L2, the center y of which is connected to the center of the bridge arm containing the capacitors C3 and C4. Thus, a commutating circuit, which consists of a capacitor in series with one-half of a choke, is shunted across each controlled main valve. The commutating circuit for the main valve n1 consists, for instance, of the series circuit containing the capacitor C1 and the upper half of the choke L1, shunted across it. The valve n1 is quenched by the firing of the controlled main valve n2. The controlled main valve n2, in turn, is quenched by the firing of the controlled main valve n1. The controlled main valves n1 and n2 thus alternate in conducting current. The same applies to the controlled main valves n3 and n4 of the other bridge arm.

The centers x and y of the chokes L1 and L2 are outputs of the inverter and are connected to the terminals of the primery winding of transformer 21. The centers of the bridge arms with the recovery valves d1, d2, d3 and d4 are connected to taps of the inverter side winding of the transformer 21.

The d-c buses 1 and 2 of the inverter 15 are connected to a battery 17 as the substitute power source. The battery voltage $U_B$ is measured by a voltage measuring converter 35. An additional bridge arm with diodes 36 and 37 is provided for charging the battery 17. The center of the diodes 36 and 37 is connected to a supplemental winding 38 on the inverter side of the transformer 21. The first charging resistor 39 can be bridged by a further switch 44. In battery charging operation, the switch contacts of the switching device 47 and the switch 45 are closed. The battery is charged from the a-c network 13 via the line side winding and the supplemental winding 38 on the inverter side of the transformer 21 and the rectifier bridge arm with the diodes 36 and 37. If power charging or quick charging is intended, the switch 44 is closed. Then, only the charging resistor 40 is effective. The latter is designed so as to limit the charging current for power charging. For trickle charging, the switch 44 is opened. Then, the sum of the charging resistors 39 and 40 is effective. The sum of these resistors is designed for a charging current required for trickle charging. Upon switching from battery charging operation to emergency operation, the switch contacts of the switching device 47 and the switch 45 are opened.

In lieu of the battery charging device shown, other charging devices can also be provided, such as are described particularly in U.S. Pat. No. 3,999,078.

Figure 2:
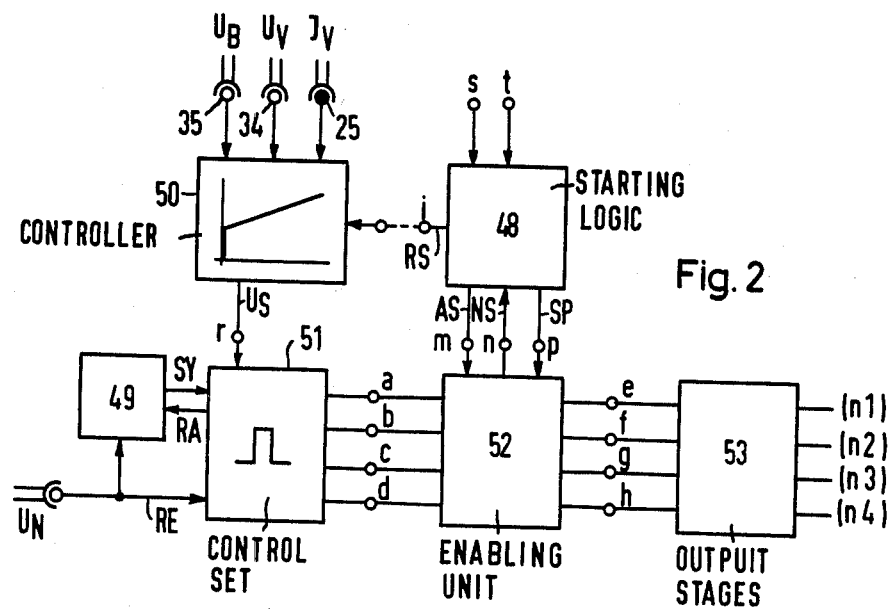
FIG. 2 is a block diagram of the control device of the inverter in the interruption free power supply of FIG. 1.

FIG. 2 shows the control device for the inverter 15 of FIG. 1 in block diagram form. The control device contains a controller 50 for generating a control voltage $U_S$ for a control set 51. The control voltage $U_S$ determines the firing angle of the firing pulses. The outputs a,b,c, and d of the control set 51 are connected to an enabling unit 52, whose outputs e,f,g and h are connected to pulse output stages 53. The pulse output stage 53 contains an oscillator and an amplifier as well as a firing pulse transformer for each main valve. The outputs of the output stages 53 are connected to the control terminals of the controlled main valves n1, n2, n3 and n4 of the inverter 15. Furthermore, starting logic circuitry 48 is provided which can be addressed at the input t by a start command START. Finally, a synchronization monitoring device 49 is provided which forms a synchronizing signal SY for the control set 51 from the line voltage $U_N$ of the a-c network 13 and a signal RA of the control set 51.

The controller 50 is of the type described in U.S. Pat. No. 4,020,360. The controller 50, which has inputs connected to the voltage measuring converter 35 for the battery voltage $U_b$, the voltage measuring transformer 34 for the load voltage $U_V$ and the current measuring transformer 25 for the load current $I_V$, even in standby operation, delivers a control voltage $U_S$ for the control set 51 such that the firing signals of the latter permit the correct firing angle for instant take over of the load power by the inverter at any starting instance. The control set 51 likewise is already running in the standby position and generates firing signals which, however, are blocked by the enabling unit 52. Upon a starting signal, START, the starting logic enables the firing signals. The inverter then can deliver the load power immediately.

Upon a stop signal STOP, that starting logic 48 blocks, by influencing the enabling unit 52, the firing pulses for the controlled main valves of the inverter in accordance with the present invention.

Figure 3:
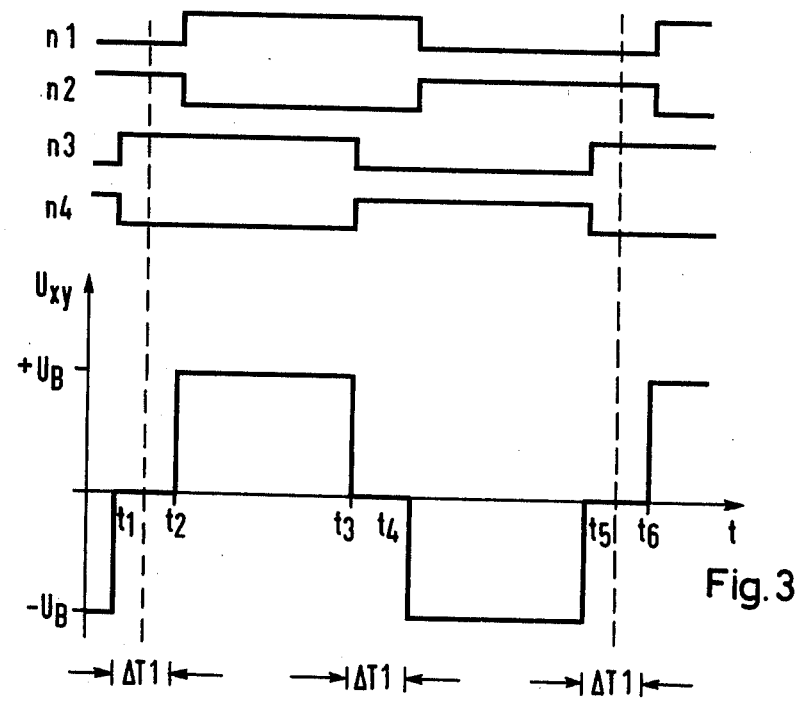
FIGS. 3 and 4 are diagrams helpful in understanding the present invention.

To explain the present invention, FIG. 3 will be considered first. In FIG. 3, the current conduction times of the controlled main valves n1, n2, n3 and n4 and the output voltage $U_{xy}$ of the inverter 15 are shown versus a time axis t. Between the two dashed timed marks is one period of the inverter output voltage. It is seen that the output voltage $U_{xy}$ is switched alternatingly back and forth between the positive value $U_B$ of the battery voltage and the negative value $-U_B$ of the battery voltage; zero voltage intervals $\Delta T1$ occur between the positive and the negative voltage time areas. The output voltage $U_{xy}$ of the inverter is zero between the times t1 and t2, between the times t3 and t4 and between the times t5 and t6. In the zero voltage interval between the times t1 and t2, the controlled main valves n2 and n3, which are connected to the d-c bus 2, conduct current. In the zero voltage interval between the times t3 and t4, the controlled main valves n1 and n4, which are connected to the other d-c bus 1, conduct current.

The present invention starts out from the fact that the inverter can be shut down if its output voltage is zero. This is the case if the valves connected to one d-c bus carry current simultaneously. According to the present invention, the state of the main valves is therefore monitored. A change of the firing pulses for the main valves is blocked if the valves connected to one d-c bus of the inverter conduct current simultaneously. After a predetermined time has passed or after the arrival of a monitoring signal that the current in the inverter is extinguished, the transmission of the firing pulses to the controlled main valves is blocked.

Figure 4:
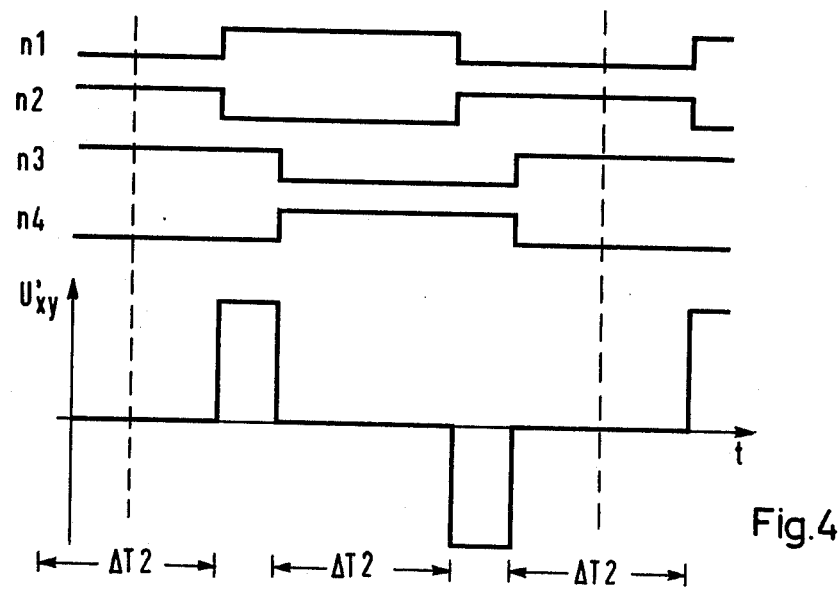

An advantageous further embodiment of the present invention is illustrated in FIG. 4. This further embodiment is characterized by the feature that, upon a stop command, the control voltage for the control set is changed in the direction toward the smallest possible output voltage of the inverter. It can be seen in FIG. 4 that the output voltage $U_{xy}$ of the inverter has substantially narrower voltage pulses. The zero voltage intervals $\Delta T2$ are correspondingly longer. If upon a stop command, the output voltage of the inverter is controlled back to a minimum value immediately, then the time when the output voltage of the inverter becomes zero and the firing pulses can be blocked is reached faster.

Figure 5:
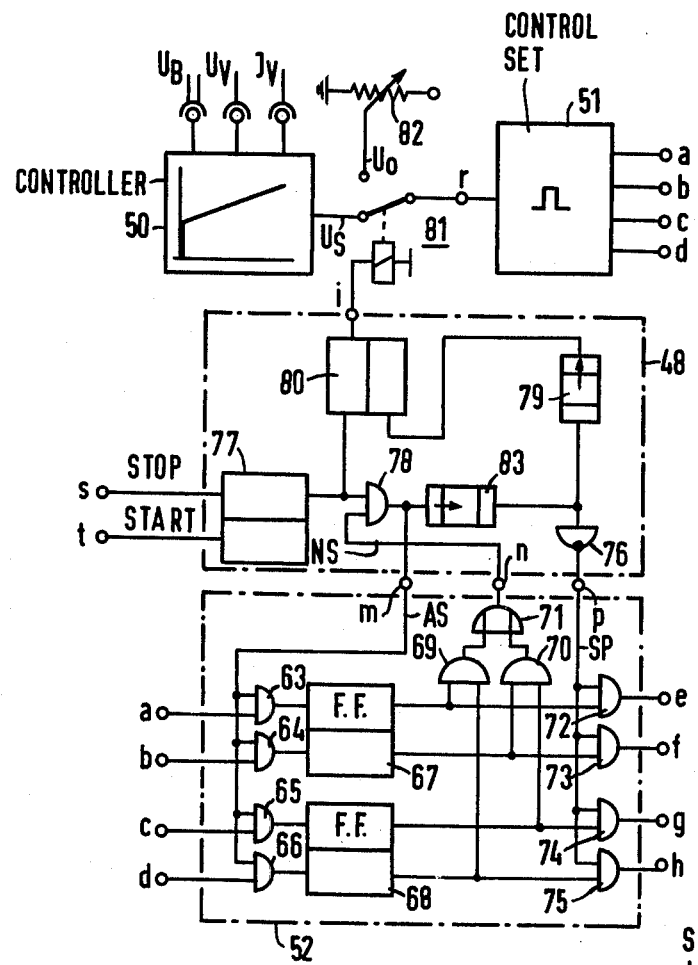
FIG. 5 is a block-logic diagram of a circuit according to the present invention.

FIG. 5 shows schematically the internal circuitry of the starting logic 48 and the enabling unit 52. The enabling unit 52 contains, at its input, inhibit gates 63,64,65 and 66, the inputs a,b,c and d of which are connected to the signal section of the control set 51 and are addressed by the firing signals. The further inputs of the inhibit gates 63, 64, 65 and 66 are connected to a terminal m. A change blocking signal AS at the terminal m blocks or inhibits the inhibit gates 63,64,65 and 66. The inhibit gates 63, 64,65 and 66 are followed by bistable multivibrators 67 and 68, the output signals of which simulate the current conducting or current blocking condition of the controlled main valves n1 to n4. The outputs of the bistable multivibrators 67 and 68 are connected to the inputs of inhibit gates 72,73,74 and 75, the further inputs of which are connected to a common terminal p. The outputs e,f,g and h of the inhibit gates 72,73,74 and 75 at the output of unit 52 lead to the output stage 53 of FIG. 2 which comprises, for each controlled main valve, an oscillator, an amplifier and a firing pulse transformer. The inhibit gates 72,73,74 and 75 can be blocked by a blocking command SP at the terminal p.

There is also provided a monitoring device with two AND gates 69 and 70 and an OR gate 71. The stored firing signals for the controlled main valves n1 and n4, which are connected to the d-c bus 1 are fed to the AND gate 69. The stored firing signals for the controlled main valves n2 and n3, which are connected to the d-c bus 2, are fed to the AND gate 70. The OR gate 71 links the output signals of the AND gates 69 and 70 to form a zero voltage signal NS at the terminal n.

The starting logic 48 contains a command memory 77, e.g., a flip-flop, the input s of which is addressed by the stop command STOP and the input t by the start command START. The output signal of the memory 77 is fed to an AND gate 78, the second input of which is connected to the output n of the monitoring device made up of gates 69, 70 and 71. Upon or after a shutdown command STOP, as soon as a zero voltage signal NS appears at the terminal n, the AND gate 78 is switched into conduction and delivers, via the terminal m, a change blocking signal AS which inhibits gates 63, 64, 65 and 66 at the input of the enabling unit 52. Thereby, a change of the firing pulses is prevented. It therefore is ensured that the output voltage $U_{xy}$ of the inverter remains zero. The output signal AS of the AND gate 78 triggers delay means 83, the output signal of which, after signal inversion in an inverter 76, appears at the terminal p as the blocking command SP to inhibit gates 72, 73, 74 and 75 at the output of the enabling unit 52. Thereby, no further firing pulses get to the controlled main valves n1 to n4 of the inverter. The delay time of the delay means 23 is determined in view of the signal delays of the firing signals by the inhibit gates 72, 73, 74 and 75 on the output side, by the delays in the output stages and by the firing delay time of the controlled main valves of the inverter. It is ensured by the delay member 83 that the blocking command SP is actually delivered only if the valves of the inverter connected to one d-c bus are actually in the current conducting state.

After the blocking command SP has blocked the firing pulses for the controlled main valves of the inverter, the current of the inverter becomes zero.

FIG. 5 also illustrates circuitry for changing the output voltages of the inverter to its minimum value in the event of a shutdown command as shown by FIG. 4. The output of the control device 50 is coupled through the switch contact of a switching device 81 to the control set 51. The control voltage input r of the control set 51 can therefore be addressed either by the control voltage $U_S$ generated by the control device 50 or by a predetermined constant voltage $U_o$. The predetermined voltage $U_o$ is set, for instance, at a potentiometer 82 to a value which corresponds to the control voltage required for a minimum output voltage of the inverter.

The switching device 21 is controlled by the output signal of a bistable storage device 80, e.g., a flip-flop. Upon a shutdown command STOP at the terminal s, the storage device 77 is set. Its output signal in turn sets the storage device 80. The output signal of the storage device 80 switches the double-throw switching device 81 from the position shown and feeds the constant voltage $U_o$ to the control set 51.

Upon a starting command START at the terminal t, the storage device 77 is reset. The storage device 80 is reset by the output signal of a delay means 79 with delayed drop-off, which has its input connected to the delay means 83. The control voltage input r of the control set 51 is therefore switched back to the output voltage $U_2$ of the control device only after the delay time of the delay means 79 has passed. The control voltage input r of the control set 51 can be switched back and the firing pulses for the controlled valves of the inverter can be enabled, for instance, also in accordance with a method such as is described in U.S. Patent Application Ser. No. 617,157.

Figure 6:
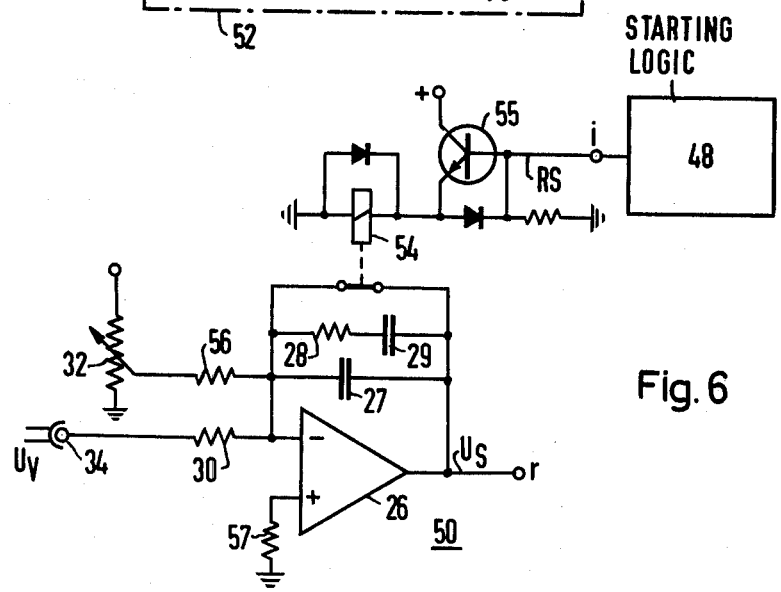
FIG. 6 is a circuit diagram of a control blocking device.

FIG. 6 shows a further possibility for returning the output voltage of the inverter to its minimum value. This embodiment is suited for a control device in which a control voltage of zero corresponds to the minimum value of the inverter output voltage. The control device 50 is schematically shown as an operational amplifier 26, the inverting input of which is functionally connected via a first input resistor 30 to the voltage measuring pickup 34 for the load voltage $U_V$ and is connected via a further input resistor 56 to a setpoint potentiometer 32. The non-inverting input of the operational amplifier 26 is set to a reference potential via high-resistance resistor 57. The feedback path of the operational amplifier 26 is equipped with a series circuit consisting of an ohmic resistance 28 and a capacitor 29, across which a further capacitor 27 is shunted. The feedback path of the operational amplifier 26 is bridged by the switch contact of a switching device 54 which is controlled via a transistor 55 by the starting logic 48. Upon a control blocking signal RS at the output terminal i of the starting logic 48, the coil of the switching device 54 is energized via the transistor 55 and closes all the contact in the feedback path of the operational amplifier 26. The output voltage $U_S$ at the output terminal r of the control device 50 is thereby practically brought to the reference potential.

The control blocking device shown in FIG. 6 can be used in FIG. 2 if the connection, shown by the dashed line, between the starting logic 48 and the control device 50 is connected up.

I claim:

1. A method for shutting down an inverter with bridge arms with controlled main valves and further bridge arms with recovery diodes, the control terminals of which are connected via an enabling unit to a control set, having as an input a control voltage determining the firing angle of the firing pulses comprising:
    (a) monitoring the current conducting state of the valves;
    (b) blocking a change of firing pulses for the main valves when the valves connected to one d-c bus of the inverter conduct current simultaneously; and
    (c) after a predetermined time has passed blocking the transmission of the firing pulses to the controlled main valves.

2. The method according to claim 1 and further comprising, upon a shutdown command, changing the control voltage for the control set in a direction toward the smallest possible output voltage of the inverter.

3. A circuit for shutting down an inverter with controlled main valves, the control terminals of which are connected via an enabling unit to a control set having as an input a control voltage determining the firing angle of the firing pulses comprising:
    (a) the enabling unit including at its input a group of first inhibit gates, one for each main valve, the inputs of which are addressed by the firing signals for the main valves and in common by a change blocking signal, a bistable multivibrator for each two gates having the outputs of said gates as inputs and a group of second inhibit gates, one for each main valve, at its output having as inputs the outputs of said bistable multivibrators and, as a common input, a blocking command;
    (b) means for monitoring the output signals of said bistable multivibrators to indicate the valve state of the main valves and to generate a zero voltage signal when firing signals for the main valves connected to a d-c bus of the inverter are present simultaneously;

(c) ANDing means having as inputs a shutdown command and the zero voltage signal and providing as an output blocking signal for said first inhibit gates; and (d) delay means addressed by said change blocking signal having as an output said blocking command for for said second inhibit gates.

4. A circuit according to claim 3 and further including means for switching the control voltage for the control set to a value for the minimum output voltage of the inverter upon a shutdown command.

* * * * *